(12) United States Patent
Maertens

(10) Patent No.: US 6,526,214 B2
(45) Date of Patent: Feb. 25, 2003

(54) DVD SUB-PICTURE DECODER WITH MINIMAL BUFFERING

(75) Inventor: James N. Maertens, Sunnyvale, CA (US)

(73) Assignee: Oak Technology, Inc., Sunnyvale, CA (US)

(*) Notice: Subject to any disclaimer, the term of this patent is extended or adjusted under 35 U.S.C. 154(b) by 0 days.

(21) Appl. No.: 09/059,664

(22) Filed: Apr. 13, 1998

(65) Prior Publication Data

US 2002/0106183 A1 Aug. 8, 2002

(51) Int. Cl.$^7$ .................. H04N 11/02; H04N 9/79; H04N 9/81
(52) U.S. Cl. .................. 386/33; 386/31; 386/45
(58) Field of Search .................. 386/33, 27, 31, 386/34, 45, 40, 38, 109, 111, 112, 4, 52, 107, 117, 124, 125, 126; H04N 11/02, 9/79, 9/81

(56) References Cited

U.S. PATENT DOCUMENTS 6,031,963 A * 2/2000 Kitamura et al. .......... 386/109
6,115,529 A * 9/2000 Park .......................... 386/1

* cited by examiner

Primary Examiner—Robert Chevalier
(74) Attorney, Agent, or Firm—Townsend and Townsend and Crew LLP (57) ABSTRACT

A memory efficient method for translating and displaying sub-picture images for DVD data. The method uses less memory than prior systems. Rather than storing the sub-picture image in a memory, the method decodes and displays the sub-picture images on-the-fly. Subsequent sub-picture pixels are being translated as a given sub-picture pixel is being displayed on a display.

16 Claims, 6 Drawing Sheets

DVD SUB-PICTURE DECODER WITH MINIMAL BUFFERING

BACKGROUND OF THE INVENTION

The present invention relates generally to DVD devices, and, more particularly, to a method and apparatus for decoding and displaying a DVD sub-picture.

DVD discs (which initials have been attributed to stand for "digital versatile disc" and "digital video disc") are small, circular discs used as a non-volatile storage medium. DVD discs are commonly used to store digital data, especially audio and video image data. The audio and video images are typically formatted and encoded according to industry standard protocols before being stored on a DVD disc. Such standards include DVD VOB, VideoCD, CD-I, MPEG-1, MPEG-2, CD-ROM, or CD-DA. A DVD player reads the encoded data from the DVD and decodes it for reproduction on a computer, television, or other audio/visual device.

The decoded data on a DVD disc typically includes an audio stream, a main video image stream, and a sub-picture video image stream. The sub-picture typically overlays the main video image and may contain a variety of different types of information such as menus, sub-titles, and directives. The main video image and the sub-picture image are separately processed, then combined for simultaneous display on the screen.

A suggested method of decoding the sub-picture is described in *DVD Specifications for Read-Only Disks—Part 3*, available from Toshiba Corporation ("DVD Specification"). The DVD Specification describes the formats for encoding the data, and provides a suggested method of decoding the encoded sub-picture image. The suggested method defines two different areas of memory for use in decoding the sub-picture. Typically, these memory areas are found in a dynamic random access memory (DRAM). The first memory area is an input sub-picture stream buffer with a fixed size of 52 Kbytes. It is used to handle the flow of the incoming bitstream. As data comes from the DVD disc, it is stored in the first memory until it can be processed and decoded. The second memory area holds up to 405 Kbytes and is for storing the decoded sub-picture image after it is formed. The DVD player decodes the data and forms a sub-picture image. The fully formed sub-picture image is stored in the second memory area until it is displayed.

It is desirable to be able to perform the same operation using less memory with no loss of data or degradation of the sub-picture image. Large memories translate into higher costs, more power consumption, and larger profile devices, to name a few of the disadvantages associated with larger memories.

Consequently, an improved DVD player and method of decoding DVD images using less memory to decode the sub-picture is desirable.

SUMMARY OF THE INVENTION

The present invention provides a memory efficient method of decoding and displaying sub-picture images for DVD data. Rather than storing the sub-picture image in a memory as is done in prior art systems, the present invention decodes and displays the sub-picture images on-the-fly. An improved DVD player is also disclosed for implementing the inventive method.

In accordance with one embodiment of the present invention, sub-picture data from the DVD disc includes compressed image data and control data. The sub-picture decoder decompresses the compressed image data, translates the image data to form a sub-picture pixel, and displays the sub-picture pixel on-the-fly. The sub-picture image is not stored in a memory prior to being displayed.

In accordance with another embodiment of the present invention, the compressed image data and the control data are stored initially in a buffer memory. The compressed image data and the control data are separately staged to first-in, first-out memories. A display command state machine reads the control data and using the information contained therein, controls the flow and translation of the compressed image data to a sub-picture pixel. The translation from image data to a sub-picture pixel is done by using a lookup table that holds color and contrast information for various types of pixels. After translating the image data, the sub-picture pixel is displayed on-the-fly. An output formatter operates on the sub-picture pixel to put it in a format expected by the particular display being used.

A further understanding of the nature and advantages of the inventions herein may be realized by reference to the remaining portions of the specification and the attached drawings.

DETAILED DESCRIPTION OF THE SPECIFIC EMBODIMENT

Figure 1:
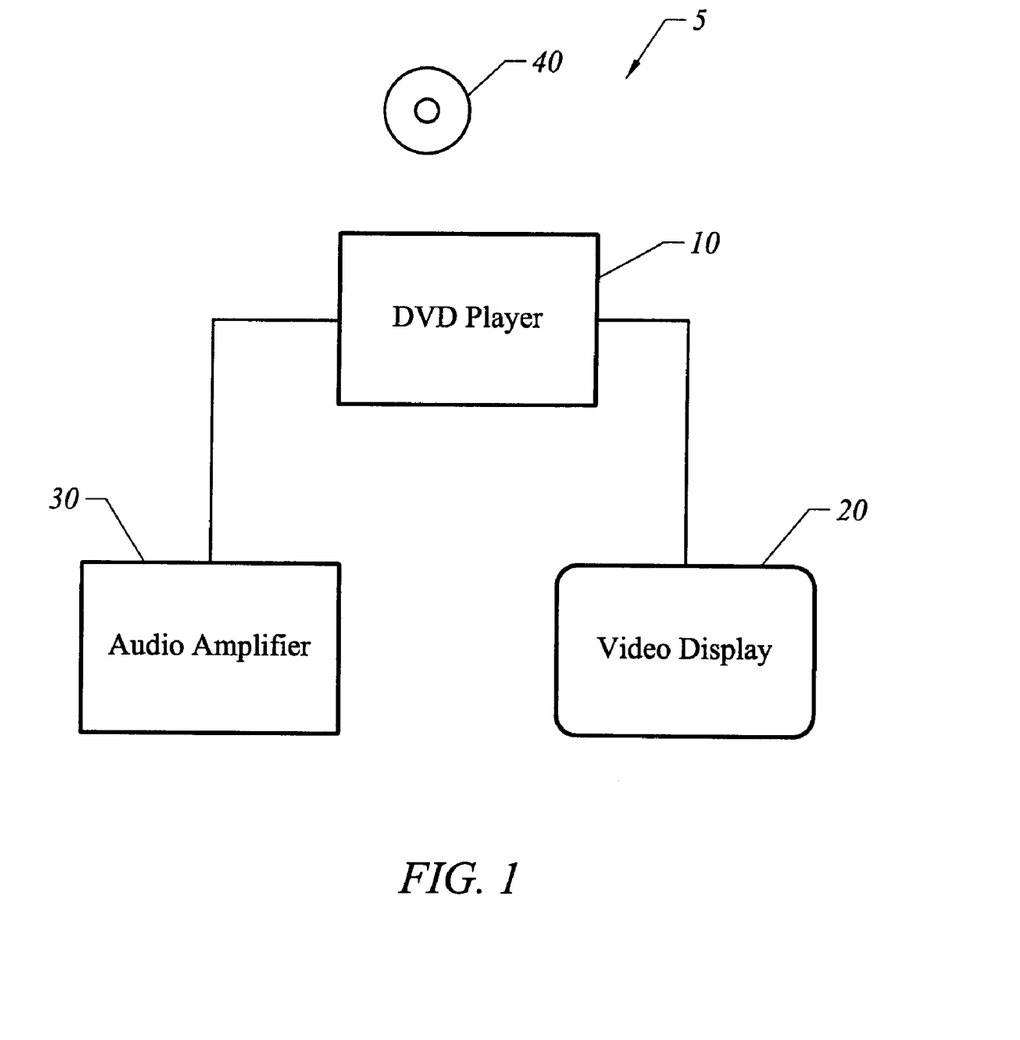
FIG. 1 is a block diagram of a digital system in which the present invention may be embodied.

FIG. 1 is a block diagram of a digital system 5 in which the present invention may be embodied. A DVD player 10 is coupled to a video display unit 20 and an audio amplifier 30. DVD player 10 operates on a DVD disc 40. Although shown in FIG. 1 as a standalone unit, DVD player 10 may be incorporated within a more complex system such as a personal computer, an integrated audio/visual system, and the like.

DVD disc 40 is a non-volatile storage device of a type well-known in the industry. It most often contains data that is representative of audio/visual information, although other information may be stored on the disc, also. The data often includes audio data, main video data, and sub-picture data. The data is typically encoded and stored according to industry standard protocols such as MPEG-1, MPEG-2, DVD VOB, VideoCD, CD-I, CD ROM, or CD-DA. Other encoding methodologies may also be used.

Video display unit 20 may be any type of display for reproducing video images. It may be a computer monitor, television screen, LCD display, or any other display device now known or later developed. It may operate on analog or digital input data. In the specific embodiment, video display 20 operates on a digital $YC_bC_r$ video signal, the details of which will be understood by one of skill in the art. In other embodiments, video display 20 may operate on RGB signals, or other video formats.

Similarly, audio amplifier 30 may be any device capable of translating an audio signal, whether it is an analog or digital signal, to sound waves capable of being heard. These devices include stereo speakers, headsets, and the like.

Figure 2:
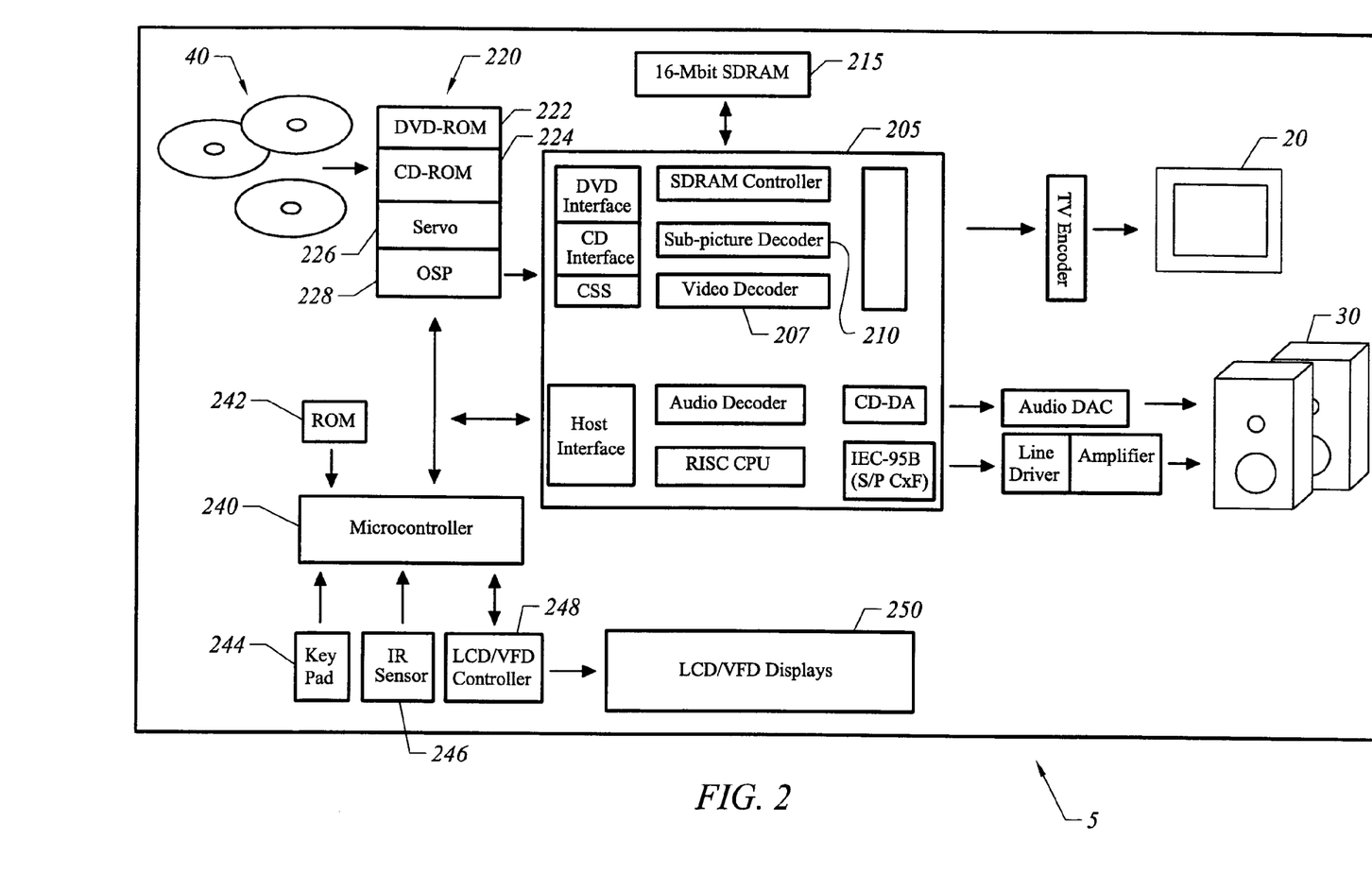
FIG. 2 is a more detailed block diagram of an exemplary DVD player within a digital system.

FIG. 2 is a more detailed block diagram of digital system 5. It will be recognized that this is but one possible embodiment of the invention, and other arrangements may be envisioned. In addition to display unit 20 and audio amplifier 30, digital system 5 includes a DVD processing block 205, a disc input unit 220, and a microcontroller 240. Many of the DVD decoding functions of digital system 5 are included in DVD processing block 205. DVD processing block 205 is preferably embodied within a single integrated circuit. Some of the functionality of DVD processing block will be discussed in more detail below. A video decoder 207 decodes the main video image and presents it for display. Of particular interest to the present invention is a sub-picture decoder 210. Sub-picture decoder decodes the sub-picture data information and prepares the sub-picture for display on display 20. The structure and function of sub-picture decoder 210 is presented in more detail below with respect to FIG. 3. A external memory 215 may also be included for data storage in association during operation of sub-picture decoder 210.

Disc input unit 220 is the mechanism by which data is read from DVD disc 40. Disc input unit 220 may include a DVD-ROM drive 222, a CD-ROM drive 224, or other types of data input devices. A servo mechanism 226 controls the mechanical movement of mechanisms in DVD-ROM drive 222 and CD-ROM drive 224 for spinning and accessing discs. A digital signal processor (DSP) 226 provides error detection and possibly error correction to the incoming data signal.

A microcontroller 240 is also included in digital system 5. Microcontroller 240 controls the operation of digital system 5 and may be a simple controller, or a sophisticated microprocessor such as may be found in a personal computer. In some embodiments of the present invention, digital system 5 may be a personal computer with a DVD-ROM drive. If so, microcontroller 240 may be the CPU of the personal computer, for example, the well-known Pentium processor or Pentium II processor, both available from Intel Corporation. Alternatively, microcontroller 240 may be a specialized controller that is designed specifically for DVD applications.

Microcontroller 240 is also coupled to appropriate peripheral devices such as a ROM 242 for storing microcode and control information, a key pad 244 for user entry of commands, and an infrared sensor 246 for receiving remote commands from a user. A display controller 248 and a display 250 are also provided to allow messages and information to be displayed to the user.

Figure 3:
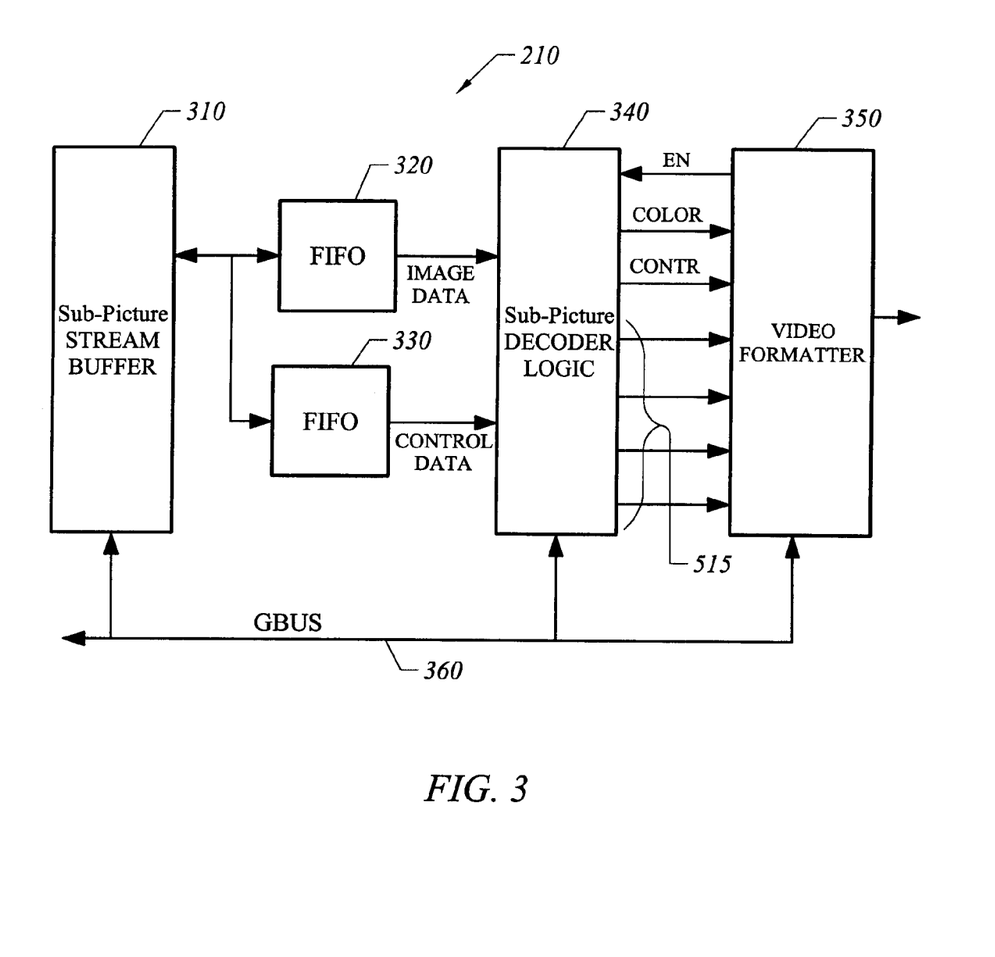
FIG. 3 is a block diagram of a sub-picture decoder according to the present invention.

FIG. 3 illustrates the general flow of data of sub-picture decoder 210 (shown in FIG. 2). Sub-picture decoder 210 receives sub-picture data and outputs a video image pixel by pixel. The video image is a composite of the main video image and the sub-picture image.

Sub-picture data comes to sub-picture decoder 210 as a sub-picture bitstream representing a sub-picture frame. The sub-picture bitstream comes from DVD disc 40 and is stored in a sub-picture stream buffer 310. Other bitstreams such as the main video image and the audio data are also routed to appropriate units such as video decoder 207 (FIG. 2). The sub-picture bitstream has two components, image data which is typically compressed and control data. Additional details about the format of the sub-picture data will be given below with respect to FIG. 4.

The image and control data are staged to FIFO memories 320 and 330, respectively. Using display commands from the control data, sub-picture decoder control logic 340 translates image data into a series of sub-picture pixels for display on a screen. The sub-picture pixels are formatted for display on a particular type of display by video formatter 350. Video formatter 350 mixes the sub-picture pixels with the pixels from the main video image and presents the composite image for display on the screen. Additional details of how these functions are performed are presented with respect to FIGS. 5 and 6 below.

A global bus (GBUS) 360 may also be included. GBUS 360 allows microcontroller 240 or other external processors to communicate with the individual modules of sub-picture decoder 210. Through GBUS 360, microcontroller 240 monitors and manipulates status and control information for sub-picture decoder 210.

Figure 4:
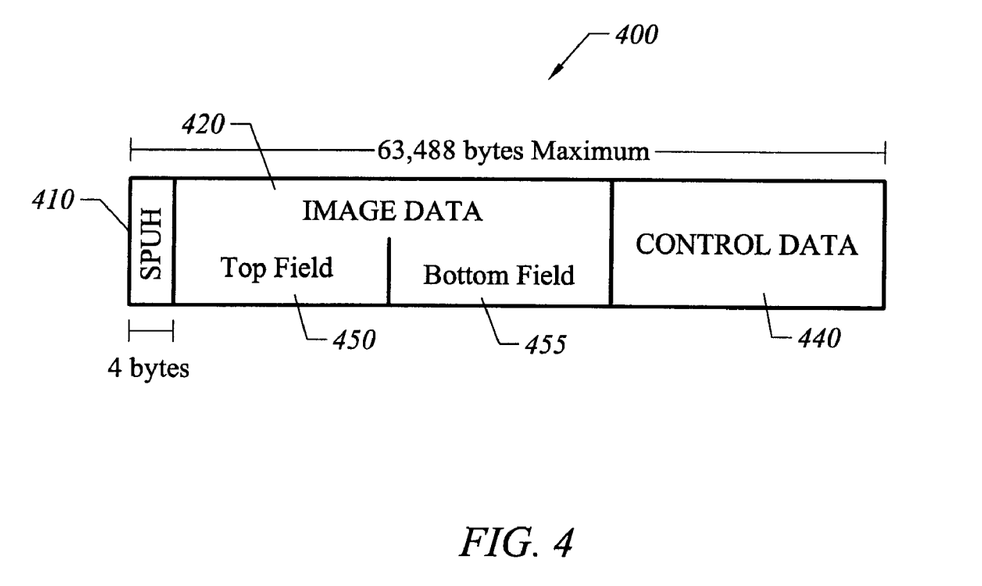
FIG. 4 shows the format of data in a sub-picture unit.

FIG. 4 illustrates the format of sub-picture unit 400. Sub-picture unit 400 represents a sub-picture image that will be displayed on the screen as a single sub-picture frame. It comprises a sub-picture unit header 410, image data 420, and control data 440.

Sub-picture unit header 410 describes the format of sub-picture unit 400. Because the lengths of image data 420 and control data 440 are variable, sub-picture unit header 410 provides information about the starting address and length of the two components. In the specific embodiment, sub-picture unit header 410 is the first four bytes (32 bits) of sub-picture unit 400. It includes 16 bits (2 bytes) defining the size of sub-picture unit 400, and 16 bits (2 bytes) defining the start address of control data 440. Image data 420 starts at the next byte following sub-picture unit header 410. From this, the length of image data 420 and control data 440 can be calculated. In the specific embodiment described herein, the maximum size of sub-picture unit 400 is 63,488 bytes. Thus, it can be addressed with 16 bits.

Image data 420 is further divided into two fields, a top field 450 and a bottom field 455. Many types of display units (such as television screens) display an interlaced image to reduce the amount of data and frame rate required for acceptable video viewing. This technique is well known in the art. The displayed image is comprised of two images that are interlaced, every other line, on the screen. These two images are stored in top field 450 and bottom field 455, respectively.

As defined in the DVD specification, image data 420 contains a set of pixel descriptors specifying how each pixel of the sub-picture image is to appear. In the specific embodiment, four different pixel descriptors are defined, so each individual pixel descriptor is a two-bit value. Although other variations may be readily envisioned, in the specific embodiment of the present invention, a pixel may be defined as a background pixel, a regular pixel, or two different types of emphasized pixels. The user may define a desired luminance, chrominance, and contrast for each of the types of pixel. Table 1 below describes the four types of pixel descriptors and the associated pixel descriptor.

TABLE 1

| Pixel Type | Pixel Descriptor |
| --- | --- |
| Background pixel | 00 |
| Pattern pixel | 01 |
| Emphasis pixel-1 | 10 |
| Emphasis pixel-2 | 11 |

Image data is generally compressed before being stored on DVD disc 40. This allows much larger amounts of data to be stored on a single disc than would otherwise be possible. Consequently, image data 420 that comes to sub-picture decoder 210 is generally compressed and must be decompressed before being displayed. In the specific embodiment, the compression is done using a run-length encoding algorithm. Run-length encoding is a lossless compression algorithm that encodes data by replacing strings of repetitive data with a coded message that describes the data and the number of times it is repeated. Table 2 describes the run-length encoding algorithm that is preferably used in the present invention.

TABLE 2

| Run-length (# of pixels) | Message data |
| --- | --- |
| 1–3 | <# of pixels> <data> |
| 4–15 | <00> <# of pixels> <data> |
| 16–63 | <0000> <# of pixels> <data> |
| 64–255 | <000000> <# of pixels> <data> |
| Repeat to end of the line | <00000000000000> <data> |

Of course, the present invention is not limited to the compression scheme described above. Other compression algorithms, run-length encoding types or otherwise, may also be used without departing from the spirit and scope of the present invention. Both lossless and lossy type encoding schemes may be used. Alternatively, aspects of the present invention may be practiced using no compression scheme at all.

Control data 440 contains a display command sequence table (DCSQT). Details of the display command sequence table is given in the DVD specification. The display command sequence table provides timing and control information for the sub-picture. The display command sequence table contains instructions for translating image data 420 into individual pixels. It includes timing, color, contrast, and other display characteristics indicative of how the pixels are to be displayed. In the specific embodiment, control data 440 is not compressed, however in other embodiments it may be compressed to further improve the bandwidth and storage requirements.

The display command sequence table contains a list of display control sequences, each of which contains a display control start time, the address of the next display control sequence, and a series of display control commands. The display control commands operate to specify how each type of pixel of the sub-picture frame is to be displayed. Table 3 shows an exemplary list of display control commands that are used in the specific embodiment of the present invention, as defined in the DVD specification.

TABLE 3

| Command | Value | Comments |
| --- | --- | --- |
| FSTA_DSP | 00h | Forcibly sets display timing of pixel data. |
| STA_DSP | 01h | Sets display start timing of pixel data. |
| STP_DSP | 02h | Sets display stop timing of pixel data. |
| SET_COLOR | 03h | Sets luminance code of pixel data. |
| SET_CONTR | 04h | Sets contrast of pixel data. |
| SET_DAREA | 05h | Sets display area of pixel data. |
| SET_DSPXA | 06h | Sets display start address of pixel data. |
| CHG_COLCON | 07h | Sets change of color/contrast for pixel data. |
| CMD_END | FFh | End of Display Control Command. |

Figure 5:
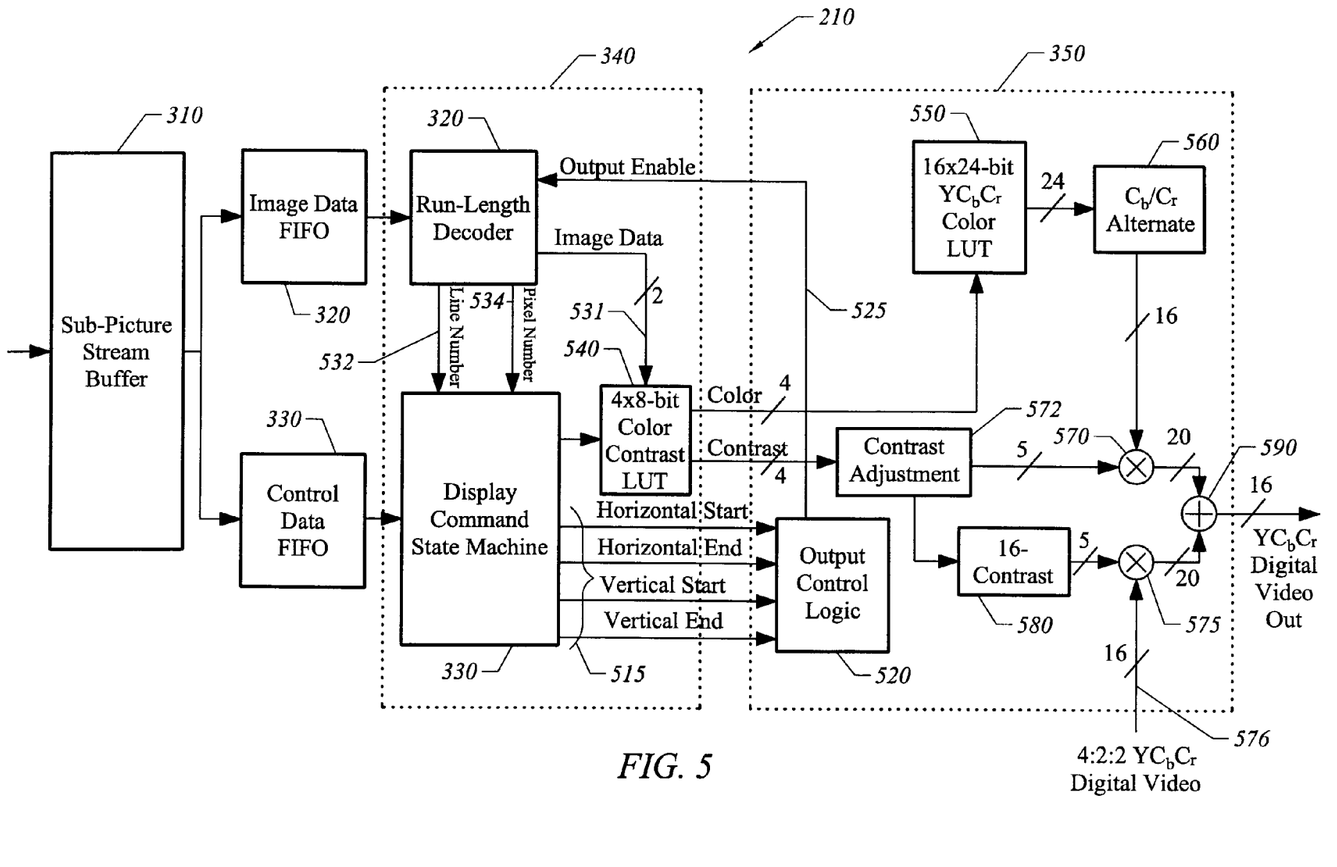
FIG. 5 is a more block detailed diagram of the sub-picture decoder according to the present invention.

Referring now to FIG. 5, a more detailed block diagram of sub-picture decoder 210 is illustrated. Elements with like reference numbers in FIGS. 3 and 5 refer to common elements. However, it will be recognized that some of the detailed functionality shown in FIG. 5 may be organized differently and yet provide similar function. For example, output control logic 520 may be included within sub-picture decoder control logic 340 instead of video formatter 350 as shown.

As the sub-picture bitstream enters sub-picture decoder 210, it is placed in sub-picture stream buffer 310 to await processing. Preferably, sub-picture stream buffer 310 is a dynamic random access memory (DRAM), although other types of memories such as static random access memory (SRAM), etc., may also be used. In the specific embodiment, sub-picture stream buffer 310 is located in external memory 215. Sub-picture stream buffer 310 corresponds to a similar memory described in the DVD specification. It holds the sub-picture unit bitstream until it is operated upon by sub-picture decoder 210. In the specific embodiment of the present invention, the size of sub-picture stream buffer 310 is twice the size of the recommended 52 Kbytes specified in the DVD specification. However, a 52 Kbyte buffer may also be used, as well as other sizes, depending upon the particular application.

In the specific embodiment, a write pointer maintains the address for writing to the sub-picture stream buffer 310, while two read pointers maintain the read addresses for reading data from sub-picture stream buffer 310. As will be described in more detail below, one of the read pointers is used to read image data 420, while the other is used to read control data 440. In the specific embodiment described herein, the read pointer for the image data initially contains the address of the position just after sub-picture unit header 410 (i.e., byte five). The read pointer for the display control table pointer initially contains the address in bytes three and four of sub-picture unit header 410 designating the start of control data 440.

Sub-picture decoder 210 also has two first-in, first-out (FIFO) memories referred to herein as image data FIFO 320 and control data FIFO 330. FIFOs 320 and 330 are used to stage image data 420 and control data 440, respectively. They ensure that the data is available and ready when it is needed during the processing of the sub-picture image. The design and structure of FIFOs are well-known in the art, and any appropriate design may be used in the present invention for providing FIFOs 320 and 330. The specific embodiment of the present invention provides an enable line (not shown) from each of the FIFOs 320 and 330 that indicate whether they have space to add data. A DRAM controller (not shown) attempts to keep the FIFOs full, and will continually transfer data to them until the enable line is unasserted indicating that the FIFO is full, or no more data is available for transfer.

In the specific embodiment, image data FIFO 320 is a 32×16 bit memory. Image data 420 is staged to image data FIFO 320 to await decompression and translation. The DRAM controller (not shown) reads image data 420 from sub-picture stream buffer 310 using the first read pointer and stores it in image data FIFO 320. Control data FIFO 330 is also preferably a 32×16 bit memory. It is used to stage the control data 440. Data is read from sub-picture stream buffer 310 using the second read pointer and stored in control data FIFO 330. It will be apparent to one of skill in the art, that the size of FIFOs 320 and 330 are not important and various implementations may use different sizes of memories to accomplish the staging of the data.

The output of control data FIFO 330 is coupled to a display command state machine 510. Display command state machine 510 performs a translation of image data 420 into sub-picture pixels. The translation is described by a series of instructions in a display command sequence table as is well-known in the art. The display command sequence table is contained in control data 440 as described above. Display command state machine 510 reads the display command sequence table from control data FIFO 330 and outputs timing control signals 515 and color/contrast load signal 517.

Control signals 515 control the timing associated with decoding of image data 420. They preferably include horizontal start, horizontal end, vertical start, and vertical end signals. Digressing for a moment, a display screen typically comprises a set of pixels arranged in horizontal lines across the screen. A frame is an instantaneous image that is displayed. The frame is displayed by updating the pixels horizontally, line by line. A vertical blanking interval (VBI) separates each frame. The vertical start and vertical end signals indicate the start and end of a sub-picture frame. The horizontal start and horizontal end signals indicate the beginning and end of a horizontal line of the sub-picture frame. An output control logic block 520 monitors control signals 515 and manipulates an output enable signal 525 to control the flow of image data 420.

As image data 420 is read by sub-picture decoder control logic 340, it is decompressed by a run-length decoder 530. Run-length decoder 530 reverses the encoding process described in Table 1, above. Of course, if a different type of compression algorithm is used, run-length decoder 530 may be replaced with an appropriate decoding unit. After decompressing image data 420, run-length decoder 530 outputs one pixel descriptor at a time on image data line 531. In the specific embodiment, this is a two bit field as illustrated in Table 2. It also outputs a horizontal line signal 532 and pixel number signal 534 identifying which horizontal line number and which sub-picture pixel within the line the pixel descriptor being output from run-length decoder is referencing.

Sub-picture decoder 210 forms a sub-picture image for display on-the-fly. That is, it translates each pixel descriptor into a sub-picture pixel and displays the sub-picture pixel on the screen in real-time (i.e., at the rate at which pixel images are scanned onto display 20). The sub-picture image is not first formed and stored in a memory for later display.

Translation of the pixel descriptors into a sub-picture pixel is accomplished using a look-up table 540. Look-up table 540 outputs four bits representing the color and another four bits representing the amount of contrast for a given sub-picture pixel based on the pixel descriptor. Display command state machine 510 loads the color and contrast values into look-up table 540 according to information in the display command sequence table. This is accomplished using color/contrast load lines 517. The color and contrast values are loaded into look-up table 540 prior to translating the pixel descriptors into sub-picture pixels. The values may be modified at any time prior to or during the translation of any of the pixels.

The color and contrast information coming from lookup table 540 describes the pixel that is to be displayed. However, it is not in the form that is expected by the display unit. Video formatter 350 transforms the image into an appropriate format and mixes the image with the main video image provided on line 576. In the specific embodiment, the format is $YC_bC_r$ digital video. It is a 16-bit format that is well-known in the art.

Video formatter 350 uses the four color bits to address a 16×24 bit $YC_bC_r$ color lookup table 550. Each of the sixteen possible color combinations are represented by an entry in lookup table 550. Each entry includes a Y component representing the amount of luminance (8 bits), and $C_b$ and $C_r$ components representing the chrominance blue and chrominance red, respectively (8 bits each). According to the convention, each pixel carries a Y component and either a $C_b$ or a $C_r$ component. The $C_b$ and $C_r$ components alternate in successive pixels. Therefore, a $C_b/C_r$ alternating logic block 560 alternatingly selects either the $C_b$ or $C_r$ component and passes it on with the Y component forming a 16-bit representation of the sub-picture image. Alternatively, each pixel may be represented by an 8-bit value, wherein the Y component and either the $C_b$ or $C_r$ component alternate (i.e., $Y-C_b-Y-C_r-\ldots$)

The contrast bits from look-up table 540 describe the amount of brightness in the sub-picture image. A contrast adjuster 570 adjusts the sub-picture image according to the contrast bits. The 4-bit value from the look-up table is adjusted by contrast adjustment logic 572. If the contrast value is zero, contrast adjustment logic 572 outputs "00000". If the contrast value is non-zero, it outputs a 5-bit value representing the input value plus one.

Since the sub-picture is juxtaposed on top of the main image, the amount of contrast of the sub-picture image is subtracted from the main image by a second contrast adjuster 575. Contrast adjuster 575 is controlled by the inverse of the contrast bits, which is obtained by subtracting the adjusted contrast value from the digital value of "10000" in subtractor 580.

An output mixer 590 completes the image by combining the $YC_bC_r$ sub-picture image with the $YC_bC_r$ main video image. In the specific embodiment output mixer 590 performs a 20-bit addition of the video and sub-picture images and outputs the 16 most significant bits.

Although, described above with respect to a $YC_bC_r$ video format, the present invention may also be used to produce RGB or other types of video imaging formats. Methods of adapting video formatter 350 to make the conversion to RGB or other formats will be readily apparent to one of skill in the art.

Figure 6:
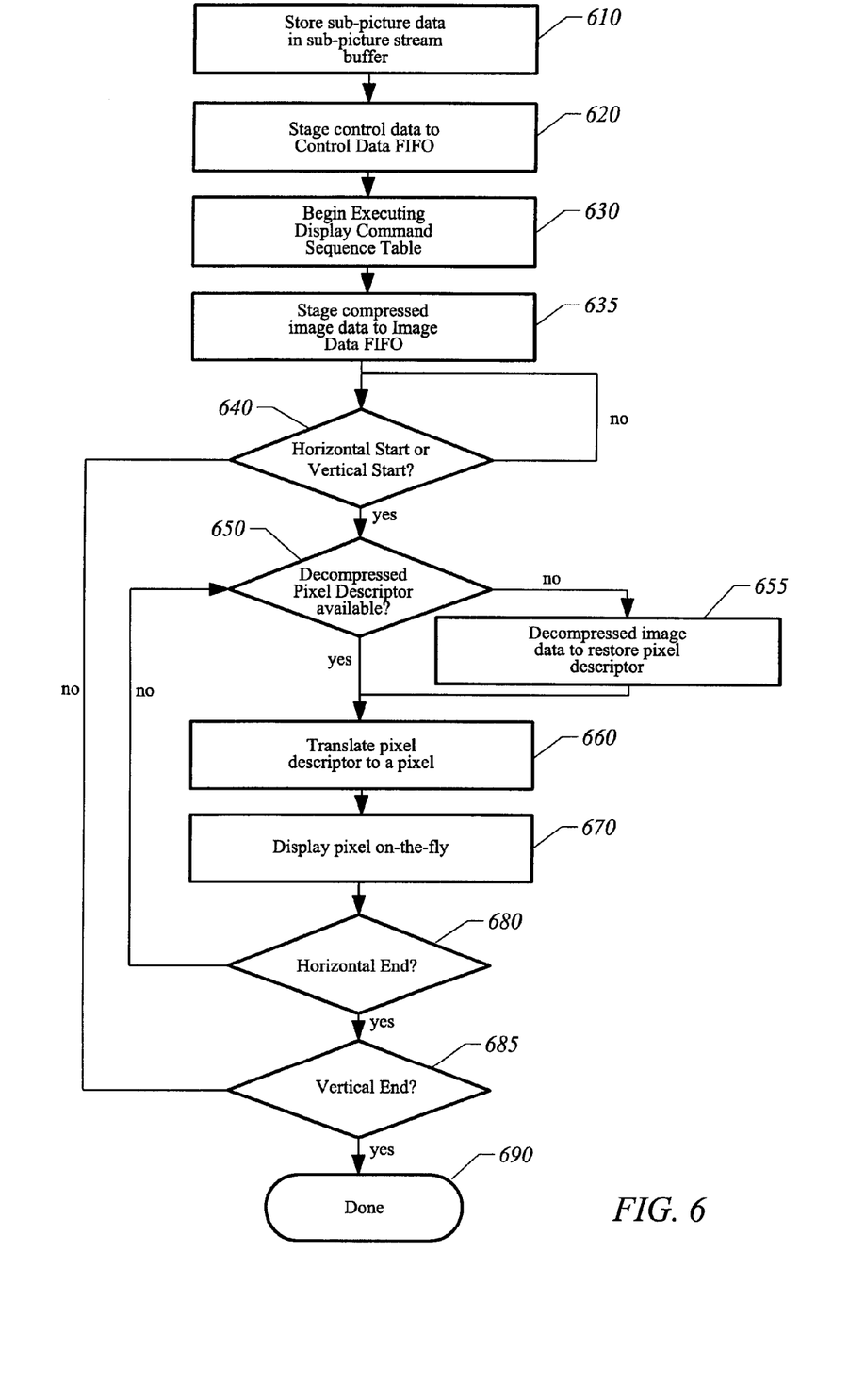
FIG. 6 is a flowchart illustrating a method for displaying sub-picture images in accordance with the present invention.

FIG. 6 is a flowchart illustrating a method by which a sub-picture frame may be displayed in accordance with an embodiment of the present invention.

In step 610, the sub-picture data is stored in sub-picture stream buffer 310. The data is stored separately as image data 420 and control data 440. In step 620, some of control data 440 is staged to image data FIFO 330. Though shown as an isolated step, step 620 actually occurs throughout the display as necessary to keep control data FIFO 320 filled with data until the end of the display command sequence table.

In step 630, display command state machine 510 begins executing the display command sequence table. This occurs during a vertical blanking interval on the screen. At this time it determines the starting time for displaying the sub-picture image. In preparation of displaying the sub-picture image, image data 420 is staged to the image data FIFO in step 635. Again, this step occurs throughout the method to ensure that image data 420 is available when needed.

At the end of the vertical blanking interval, a field is displayed on the screen, followed by another vertical blanking interval. The display command state machine 510 waits during step 640 until the appropriate time to start displaying (determined by a video processing unit and the associated display command sequence control table, as is well-known in the art). It then issues a vertical start signal, indicating the beginning of the sub-picture field. The horizontal start signal is also asserted at this time indicating the beginning of a sub-picture line. The sub-picture field may or may not begin in the upper left-hand corner of the screen, which is the beginning of the horizontal scanning, therefore the vertical start may not immediately occur at the end of the vertical blanking interval.

In step 650, if decompressed pixel descriptors are not available, a pixel descriptor is decompressed in step 655. Then, in either case, in step 660 the pixel descriptor is translated to a sub-picture pixel using lookup table 540. In step 670, this sub-picture pixel is received from lookup table 540, translated to the proper format for display, and displayed on the screen on-the-fly. As described above, the sub-picture image is mixed with the main video image before display. Each sub-picture pixel occupies the same physical location on display 20 as a main video pixel. To accommodate on-the-fly display of sub-picture pixels, such mixture of sub-picture image with main video image also occurs on-the-fly.

On-the-fly operation is carried out through uninterrupted execution of operations in at least steps 650–670. Uninterrupted execution, as used herein, means sub-picture pixels are not temporarily stored in a memory awaiting display; rather, these pixels are created and displayed at an uninterrupted rate sufficient to satisfy the main video image. This results in a pipelined effect where pixels are being displayed while subsequent pixels are simultaneously being formatted (in video formatter 350) and created in sub-picture decoder logic 340.

After displaying a pixel, in step 680 display command state machine 510 decides if the end of a horizontal line has occurred by according to the horizontal end signal. If it has not, then the method returns to step 650 to display the next pixel. If it has, then it checks the vertical end signal in step 685 to determine if it is the end of the frame. If it is not the end of the frame, then the method returns to step 640 and awaits the next horizontal start signal. If the vertical end signal is asserted, then the method ends at step 690 for this particular sub-picture frame. Of course, during the next vertical blanking interval, the method may begin all over again for the next frame.

While the above is a complete description of specific embodiments of the invention, various modifications, alternative constructions, and equivalents may be used. Therefore, the above description should not be taken as limiting the scope of the invention as defined by the attached claims.

What is claimed is:

1. A method of displaying a sub-picture image, comprising the steps of:
   providing encoded sub-picture data including image data and control data;
   staging the control data to a first FIFO memory;
   staging the encoded image data to a second FIFO memory, wherein the second FIFO memory is functionally distinct from the first FIFO memory;
   translating the image data to form a sub-picture pixel; and
   displaying the sub-picture pixel without storing the sub-picture pixel.

2. The method of claim 1 further comprising reading the image data and control data from a DVD disc.

3. The method of claim 1 further comprising the step of repeating the translating and displaying steps until an entire frame is displayed.

4. The method of claim 1 further comprising the step of translating the image data for a subsequent sub-picture pixel during the displaying step of the sub-picture pixel.

5. The method of claim 1 further comprising the steps of:
   writing the sub-picture data to a bitstream buffer;
   reading the image data from the bitstream buffer using a first read pointer; and
   reading the control data from the bitstream buffer using a second read pointer.

6. The method of claim 1 further comprising the step of beginning execution of the control data during a vertical blanking interval.

7. The method of claim 1 wherein the translating step further comprises the steps of:
   loading color and contrast information into a first lookup table; and
   referencing the first lookup table with the image data and outputting the corresponding color and contrast information.

8. The method of claim 7 further comprising the steps of:
   referencing a second lookup table with the color information from the first lookup table; and
   providing a $YC_bC_r$ video output based on the color information.

9. The method of claim 1 further comprising the step of mixing the sub-picture image with a main video image.

10. The method of claim 1 wherein the control data comprises a display command sequence table.

11. The method of claim 1 further comprising the step of decompressing the image data.

12. The method of claim 11 wherein the decompressing step is done with a run-length decoding algorithm.

13. A method of displaying a sub-picture image, comprising the steps of:
    providing encoded sub-picture data including image data and control data;
    storing the encoded sub-picture data in a buffer;
    staging the encoded image data to a second FIFO memory, wherein the second FIFO memory is functionally distinct from a first FIFO memory;
    staging the control data to the first FIFO memory, wherein the second FIFO memory is functionally distinct from the first FIFO memory;
    executing the control data;
    loading a lookup table with color and contrast information from the control data;
    translating the image data to form a sub-picture pixel by referencing the lookup table with the image data; and
    displaying the sub-picture image without storing the sub-picture pixel.

14. A method of displaying a sub-picture image, comprising the steps of:
    storing encoded sub-picture data including image data and control data in a first memory;
    staging the image data from the first memory to a first FIFO memory;
    staging the control data from the first memory to a second FIFO memory;
    translating the image data to form a sub-picture pixel; and
    displaying the sub-picture pixel without storing the sub-picture pixel.

15. The method of claim 14 wherein the staging of the first FIFO memory and the staging of the second FIFO memory may be done independently from one another.

16. The method of claim 1 further comprising storing the encoded sub-picture data in a first memory prior to staging the image data in the first FIFO memory and prior to staging the control data in the second FIFO memory.

* * * * *